UNITED STATES PATENT OFFICE.

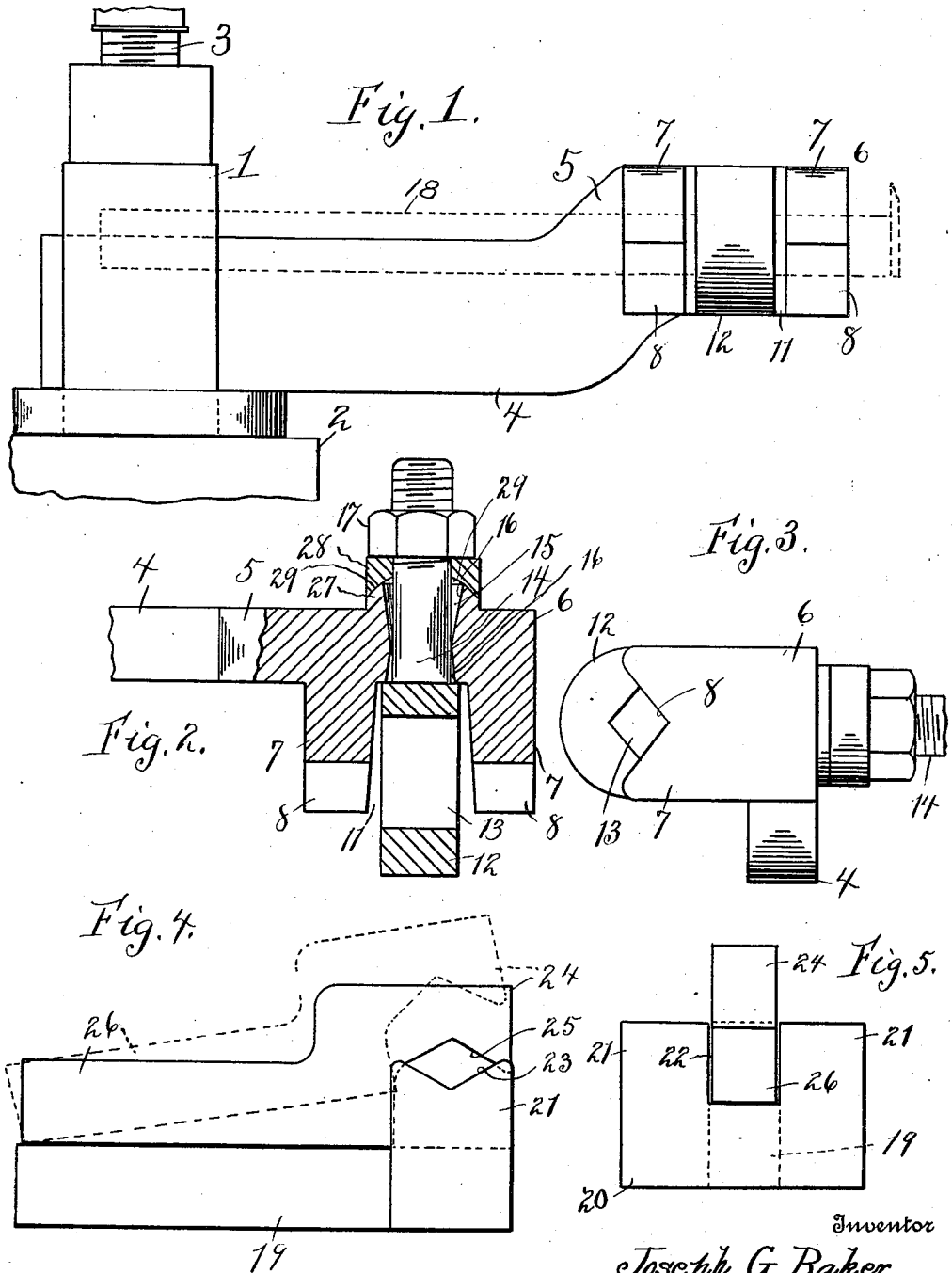

JOSEPH G. BAKER, OF VINELAND, NEW JERSEY.

TOOL-HOLDER.

1,011,717.  Specification of Letters Patent.  Patented Dec. 12, 1911.

Application filed April 14, 1911. Serial No. 621,052.

*To all whom it may concern:*

Be it known that I, JOSEPH G. BAKER, a citizen of the United States, residing at Vineland, in the county of Cumberland and State of New Jersey, have invented a certain new and useful Improvement in Tool-Holders, of which the following is a specification.

My invention relates to new and useful improvements in tool holders, adapted to be held in the tool post of a lathe or like machine by the tool post screw, and has for its object to so construct the holder that the same may be adjustable to different size boring or inside turning or threading tools.

A further object of the invention is to produce a holder which will adjust itself to different shape tools and either straight or taper shank drills or reamers.

A still further object of the invention is to provide a tool holder comprising exceedingly few parts, thereby producing an inexpensive article, but one which will be very strong and durable.

Another object of the invention is to construct the tool holder in such a manner as to cause the head to be offset laterally from the shank so that when said holder is in use, the upper edge of the shank will be in the same plane as the longitudinal center of the tool.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is a side elevation of a tool holder constructed according to my improvements, showing said tool holder mounted in a tool post, and illustrating the position taken by a tool in dotted lines. Fig. 2, a longitudinal sectional view of the head of the tool holder. Fig. 3, a front end view. Fig. 4, a side elevation of a modified form of the tool holder, and Fig. 5, a front elevation thereof.

In carrying out my invention as here embodied, (1) represents the ordinary tool post carried by the usual slide rest 2 of a lathe, said post being provided with a screw 3.

4 is the shank of my improved tool holder which is preferably rectangular in shape, which is offset at one end as designated at 5 to produce a head 6. With the head are formed a pair of tool clamp jaws 7. The jaws 7 being spaced apart produce between them a cavity or opening 11, in which slides the movable jaw 12, said jaw having a tool opening 13 and being further provided with a round shank or bolt 14 which passes through an opening 15 in the head 6. The side walls of said opening diverge from a central point outwardly toward both faces of the head as at 16, providing sufficient room for radial movements of the bolt 14, thus permitting the movable jaw 12 to adjust itself to the different shaped tools as for instance those tools which have tapering shanks. On the bolt 14 is mounted a nut 17, between which and the lug 27 is interposed a washer 28, the meeting surfaces being concaved and convexed as at 29 to permit the radial movement; said nut binds upon the washer causing it to tighten around a tool.

A tool 18 is shown in dotted lines in Fig. 1 to clearly illustrate that the upper edge of the shank 4 of the tool holder is in the same plane as the longitudinal center of the tool, thus producing a holder which when placed in the tool post and clamped home, the upper edge of the shank will be in alinement with the centers of the lathe, so that when the tool is placed in position its center will be at the correct point, and from which point all ordinary adjustments can be made; in other words by offsetting the head from the shank the line on which the walls of the tool notches 8 meet will be in alinement with the upper edge of the shank.

In Figs. 4 and 5 I have shown a modified form of tool holder, in which the adjustments are obtained and held by the clamp screw of the tool post, and in this form of my device I use but two members, a base carrying the stationary jaws, and a movable jaw which is provided with a shank to permit of adjustments by the tool post clamp screw. In this form of my invention, 19 represents the shank provided with a head 20, a portion of which extends each side of the shank, and from this head are formed the stationary jaws 21 by producing a cavity 22, the lower wall of which is preferably in alinement with the upper edge of the shank. These jaws are provided with the tool notches 23 adapted to carry a tool at right angles to the position shown in the preferred form, illustrated in Fig. 1. 24 designates the movable jaw which has a tool notch 25 formed in its lower edge, said jaw having produced therewith an integral shank 26, which shank is adapted to overlie the shank 19 and rest thereon throughout its length, when at its smallest adjustment. In this form of my invention, the tool is placed in the notches of the stationary jaws, and the movable jaw then placed above the tool, at which time the shanks 19 and 26 may be inserted in the tool post, then by threading the clamp screw downward it will tighten the movable jaw and its shank upon the tool and the shank 19 respectively, clamping the tool securely in place.

Of course I do not wish to be limited to the exact details of construction as here shown, as these may be varied within the limits of the appended claims without departing from the spirit of my invention.

Having thus fully described my invention, what I claim as new and useful, is—

1. In a tool holder, a shank, one end of which is offset laterally to produce a head, said head having an opening the side walls of which diverge from a central point toward both faces of the head, stationary jaws having tool notches therein, a movable jaw having a tool opening therein mounted between the first named jaws, a bolt carried by the movable jaw passing through the last named opening in the head, and a nut threaded on said bolt for adjusting the movable jaw.

2. In a tool holder, a shank, an integral head formed therewith, jaws formed from said head by producing a cavity therein, the lower wall of said cavity being in the same plane as the upper face of the shank, said jaws having tool notches therein, a movable jaw, a shank formed integral therewith, said shank overlying the last named jaw, co-acting with the first named jaws working within the cavity to hold a tool.

3. A tool holder adapted to work in conjunction with a tool face, comprising a shank, a head formed integral with said shank having a cavity produced therein, the lower wall of which is in the same plane as the upper face of the shank, jaws produced by the formation of said cavity having tool notches therein, a movable jaw having a tool notch therein co-acting with the first named jaws, and an integral shank formed with the movable jaw overlying the first named shank, said shanks being inserted in the opening of a tool post and held in adjusted position by the tool post clamp screw.

4. In a tool holder, a shank having one end offset laterally to produce a head, said head having a lug formed therewith, the face of which is convex, an opening passing through the head and said lug, the walls of said opening diverging from a central point in the head toward the faces of said head, and the lug, a pair of stationary jaws carried by the head, a movable jaw provided with a bolt, said bolt passing through the opening in the head and lug, a washer having a concaved face mounted upon said bolt and riding upon the convexed lug, and a nut threaded upon said bolt and resting against the washer.

In testimony whereof, I have hereunto affixed my signature in the presence of two subscribing witnesses.

JOSEPH G. BAKER.

Witnesses:
 Edw. W. Austin,
 M. E. Yost.

Copies of this patent may be obtained for five cents each, by addressing the "Commissioner of Patents, Washington, D. C."